United States Patent [19]

Kröbel et al.

[11] 4,248,172

[45] Feb. 3, 1981

[54] FILM CASSETTE

[75] Inventors: Heinz Kröbel, Taufkirchen; Walter Bauer; Manfred Schmidt, both of Munich, all of Fed. Rep. of Germany

[73] Assignee: AGFA-Gevaert, A.G., Leverkusen, Fed. Rep. of Germany

[21] Appl. No.: 68,178

[22] Filed: Aug. 20, 1979

[30] Foreign Application Priority Data

Aug. 31, 1978 [DE] Fed. Rep. of Germany ....... 2838058
Dec. 29, 1978 [DE] Fed. Rep. of Germany ....... 2856703

[51] Int. Cl.³ .................. G09F 9/00; N01N 9/16; G01D 11/00; G01D 13/00
[52] U.S. Cl. ............................. 116/200; 116/213; 116/279; 206/455; 206/459; 250/480
[58] Field of Search .................. 206/455, 459, 449; 116/200, 213, 279; 250/480, 481

[56] References Cited

U.S. PATENT DOCUMENTS

| | | | |
|---|---|---|---|
| 2,910,957 | 11/1959 | Lustig | 116/213 |
| 3,630,172 | 12/1971 | Neumann | 116/200 |
| 3,703,272 | 11/1972 | Lareau | 250/480 |
| 3,996,428 | 12/1976 | Buan et al. | 116/279 |

Primary Examiner—William T. Dixson, Jr.
Attorney, Agent, or Firm—Peter K. Kontler

[57] ABSTRACT

An indicating arrangement for indicating the absence or presence of film in the interior of an X-ray film cassette includes an indicating member movably mounted on one portion of the cassette. Another portion of the cassette which is juxtaposed with the one portion has a recess therein, in which the inner end of the indicating element is received when film is absent from the internal space of the cassette, but which is covered by the film when the same is properly introduced into the internal space of the cassette so that the inner end of the indicating element is prevented from entering this recess. The position of the indicating element can be perceived at the exterior of the one portion of the cassette in a tactile or visual manner. The indicating element may be a discrete element mounted on the cassette, or a one-piece part of a flexible portion of the cassette. In either event, the indicating element is guided in a rigid portion of the cassette so that the position of the indicating element relative to this rigid portion may be ascertained either by touch or by observation.

20 Claims, 7 Drawing Figures

FILM CASSETTE

BACKGROUND OF THE INVENTION

The present invention relates to receptacles for objects, and more particularly to film cassettes. Still more particularly, the invention relates to a cassette for an X-ray film.

In the past, it has often been found to be disadvantageous, especially in connection with X-ray cassettes, when the user was unable to ascertain whether or not the cassette was charged with the film, without opening the cassette. As a result of this inability, mistakes have often been made in that either an empty cassette was used during an X-ray exposure or, especially in automatic feeding and discharging systems, a single cassette was used more than once. In each instance, the intended picture had to be taken again, which is not only very wasteful of time, but also exposes the patient to unnecessary amount of radiation.

To avoid this disadvantage, it was proposed in the German Pat. No. 825 947 to provide the X-ray cassette, which includes two cassette halves that together bound a space from which ambient light is excluded, with a movable element which assumes a first perceptible position when the cassette is charged, and a second perceptible position when the cassette is not charged.

However, such an arrangement can only be used in connection with rigid plates. An X-ray film, because of its flexibility and its relative thickness, would not be indicated by such an arrangement.

OBJECTS AND SUMMARY OF THE INVENTION

Accordingly, it is a general object of the present invention to avoid the above-mentioned disadvantages of the prior art.

More particularly, it is an object of the invention to provide a film cassette, especially an X-ray film cassette, which is not possessed of the disadvantages of the prior art cassettes of this type.

Yet another object of the invention is to so construct the cassette of the type here under consideration as to be able to ascertain the state of the cassette, that is, whether a flexible film is present therein or absent therefrom.

A concomitant object of the invention is to develop a cassette which, despite its above-mentioned advantages, is simple in construction, easy to operate, and reliable.

In pursuance of these objects and others which will become apparent hereafter, one feature of the present invention resides in a receptable for an object, particularly in a cassette for an X-ray film, which, briefly stated, comprises two portions which are coextensive with one another and together define a space for receiving the object; an indicating element mounted on one of the portions (particularly guided in a through hole provided in this portion) for movement in a predetermined path toward and away from the other portion and having a first zone the position of which can be perceived (either in a visual or in a textile manner) at the exterior of the receptacle, and a second zone which extends into the internal space of the receptacle; and means defining in the other portion of the receptacle a recess aligned with the aforementioned path, which recess is covered by the object when the latter is properly received in the internal space and receives the second zone of the indicated element in the absence of the object from the internal space of the receptacle.

When the receptacle of the present invention is constructed in the above-discussed manner, it is achieved that the object (particularly the X-ray film or the like) rests at the edge bounding the recess and thus offers sufficient resistance to the movement of the movable indicating element, so that the second zone of this indicating element is prevented from entering the recess. As a result of this, the movable indicating element renders it possible to ascertain the loading status of the cassette or similar receptacle (that is, whether or not the object, such as the X-ray film, is properly received in the internal space thereof) from the exterior of the cassette without opening the same, either visually or tactually.

In accordance with an advantageous aspect of the present invention, the indicating element is mounted on a closure which forms a part of the aforementioned one portion and which is movable relative to the remainder of the receptacle or cassette. When the receptacle is an X-ray film cassette, this closure may serve for juxtaposing cards or the like containing patient identification data with the film contained in the cassette. Such closure may be constructed as a window mounted in a frame, and the indicating element may then be mounted in this frame. This arrangement is especially advantageous inasmuch as the reinforcing foils are recessed at this location, which is necessary for the recognition of the loading status of the cassette with the X-ray film.

Advantageously, the indicating element is elongated, and it may be equipped with means, such as an adjusting screw, for changing its length. While not absolutely necessary, it is advantageous to provide at least one spring which urges the indicating element toward the other portion of the receptacle. In this manner, it is assured that the indicating element will automatically assume its proper indicating position, without any action on the part of the user of the cassette.

According to a further advantageous facet of the present invention, there is provided a guiding member which receives the indicating element and also the spring which urges the indicating element toward the other portion of the receptacle, the guiding member being mounted in the hole of the one portion of the receptacle for movement along the aforementioned path into and out of contact with the other portion of the receptacle. Then, at least one additional spring may be provided which has a strength exceeding that of the first-mentioned spring and which urges the guiding member toward the other portion of the receptacle. It is particularly advantageous when the one portion of the receptacle has at least two annular regions which bound the hole in the one portion of the receptacle at axial spacing from each other and which contact the guiding member. The guiding member may be advantageously constructed as a guiding sleeve which bounds a passage for receiving the indicating element and has at least one annular region which bounds the passage and contacts the indicating element.

The above-mentioned one portion of the receptacle may be formed with a depression into which one end portion of the indicating element extends in one of the positions, and beyond which this one end portion extends in the other position, or from which this end portion is absent in the first-mentioned position and in which it is received in the second-mentioned position.

In some instances, there may also be used X-ray film cassettes equipped with flexible cassette parts, the cassettes of this type being used as so-called vacuum cassettes. For such vacuum cassettes, there is proposed according to the invention a further embodiment of the indicating means, in which the vacuum tightness of the cassette is to be assured. This indicating means employs an urging member of elastic material accommodated in the above-mentioned internal space adjacent the internal surface of the one portion of the receptacle and connected to the indicating element. Such urging member may advantageously be a portion of one of the above-mentioned flexible cassette parts. The one portion of the receptacle or cassette may then be provided with an outwardly bulging portion in the region of the movable indicating element. In this manner, the loading status of the cassette can be ascertained from the exterior of the cassette even if the cassette is of the type used, for instance, in mammography, which include flexible cassette walls.

In this connection, it is advantageous when the indicating element is of one-piece with the urging member, and particularly when it is cylindrical in configuration and extends to both sides of the urging member. Then, the two sections which respectively extend to the two sides of the urging member constitute the first and the second of the above-mentioned zones, so that one of these sections is so received in the hole of the one portion of the receptacle as to be substantially flush with the other exterior of the receptacle in the absence of the object from the internal space of the receptacle and while the other section extends into the above-mentioned recess. The urging member is deflected into the outwardly bulging region around the hole in the presence of the object in the internal space and while the other section of the indicating element extends to a perceptible extent outwardly beyond the bulging region.

It is also advantageous when, in order to facilitate the visual perception of the loading status of the cassette or similar receptacle, a section either of the indicating element or of the one portion of the receptacle has a surface which is visible in one and concealed in the other position of the indicating element and which is visually differentiated from, especially of a different color than, the surrounding area. When this expedient is resorted to, it is not necessary for the user of the cassette or similar receptacle to exclusively rely on the perception of the extent to which the first zone of the indicating element extends into or out of the hole or the depression surrounding the same. Rather, the different coloration provides an easy visual indication of the position of the indicating element.

The novel features which are considered as characteristic of the invention are set forth in particular in the appended claims. The improved invention itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
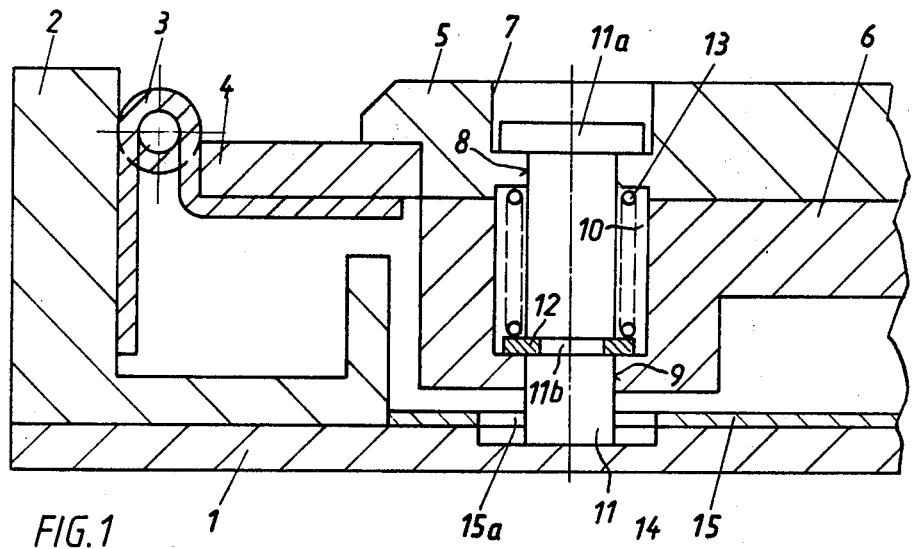
FIG. 1 is a cross-sectional view through part of a non-loaded X-ray cassette equipped with the film indication of the present invention.

Referring now to the drawings in detail, and first to FIG. 1 thereof, it may be seen that it illustrates a cassette which is adapted to be loaded with X-ray film 16. However, it is to be understood that the present invention may also be used in receptacles of other types, especially where the respective receptacle is to receive a relatively thin sheet or foil-shaped object.

In FIG. 1, the reference numeral 1 has been used to indicate a bottom portion of the cassette. A frame 2 which extends around the periphery of the bottom portion 1 is connected to the latter. A hinge 3 is connected to the inner side of one section of the frame 2, and supports a closure or lid 4. A window frame 5 for the data relating to a patient is recessed in the cassette cover 4, and a counterpiece 6 is attached to its inner side. The window frame 5 is provided at its upper side with a depression 7 in which there is provided a bore or hole 8. Another bore or hole 9 which is aligned with the hole 8 is formed in the lower part of the counterpiece 6. The bore 9 widens into a depression 10 in that region of the counterpiece 6 which faces the window frame 5.

An indicating pin 11 is guided in the bores 8 and 9 and is formed with an enlarged portion 11a which is situated in the depression 7. Furthermore, a groove 11b is formed in the pin 11, which is located in the depression 10 upwardly of the hole 9. A ring 12, for instance, a resilient retaining ring, 11b is accommodated in the groove 11b and extends radially beyond the circumference of the pin 11. A compression spring 13 is arranged around the pin 11 between the ring 12 and the lower portion of the window frame 5.

A recess 14 is formed in the cassette bottom portion 1, in which there is received, in the absence of the film 16 from the cassette, that end portion of the pin 11 which is remote from the head 11a thereof. A reinforcing foil 15 which rests on the bottom portion 1 is provided with a cutout 15a which is at least approximately aligned with the recess 14.

Figure 2:
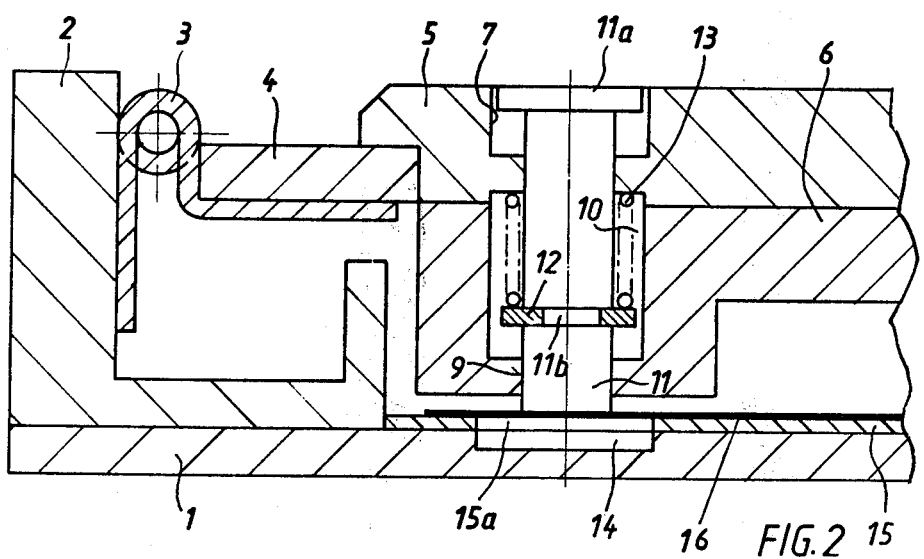
FIG. 2 is a view similar to FIG. 1 but when the cassette is loaded with X-ray film.

The operation of the indicating arrangement which has been described as to its structure based on FIG. 1 will become apparent when the situation illustrated in FIG. 2 is compared with that illustrated in FIG. 1. When film is absent from the cassette (FIG. 1) the compression spring 13 will press the pin 11 downwardly as considered in the position illustrated in the drawings, so that the lower portion of the pin 11 enters the recess 14. Simultaneously, the upper end 11a of the pin 11 becomes recessed in the depression 7. The recessed position of the pin 11 can be recognized by touching the external surface of the window frame 5. This is particularly advantageous when the light in the examining room is meager, or when the user of the cassette has his or her sense of sight preoccupied with other things. Of course, the offset or recessed position of the pin 11 can also be perceived visually. This is particularly true when the circumferential surface bounding the depression 7 is of a different color than the major surface of the window frame 5 and/or the upper surface of the end portion 11a of the pin 11. However, the visual differentiation could also be achieved by other types of markings not necessarily differentiated in color.

On the other hand, FIG. 2 illustrates the same cassette, but this time with the film 16 accommodated in the internal space thereof and supported on the reinforcing foil 15. In this position, the film 16 covers the cutout 15a of the reinforcing foil 15 and also the recess 14. As a result of this, the pin 11 is moved against the force of the spring 13 in the upward direction during the closing of the closure 4, so that the upper surface of the upper end 11a of the pin 11 becomes substantially flush with the major surface of the window frame 5. The loaded position of the cassette can thus be ascertained by touching or sweeping over this region of the exposed surface of the window frame 5.

In the discussed example, it was assumed that the film indicating means is intergrated in the patient data window, which has the advantage that the cutout of the reinforcing foil, which is provided at this location in any event, can be utilized. Of course, it is also possible to provide an arrangement of the type here under consideration at other location of the cassette independently of the patient data window, in a similar manner. Then, a suitable insert with a counterpiece is recessed into the cassette cover 4 instead of the window frame 5.

Figure 3:
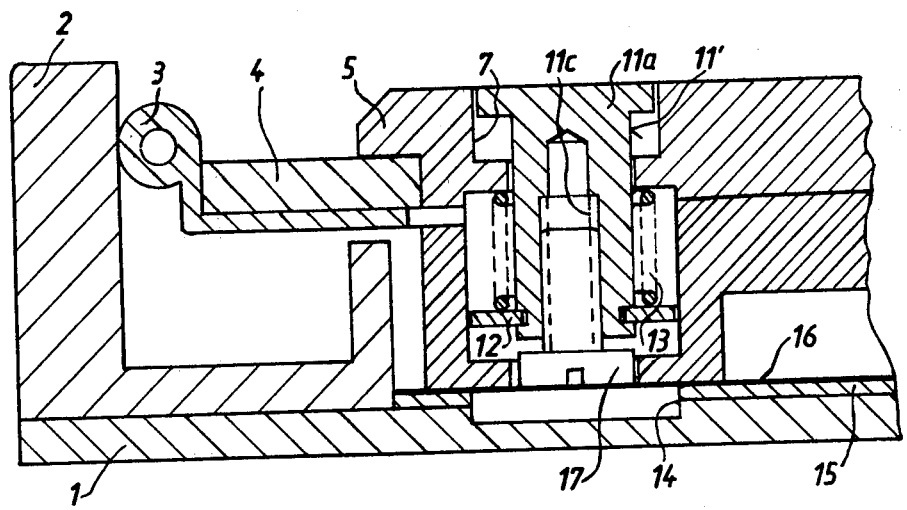
FIG. 3 is a view similar to FIG. 2 but showing a modification of the indicating arrangement.

A modification of the invention is depicted in FIG. 3, wherein the same or similar parts are indicated by the same reference numerals as used in connection with the description of FIGS. 1 and 2. Herein, there is provided an indicating pin 11' which is somewhat shorter than that illustrated in FIGS. 1 and 2. A bore provided with internal thread 11c and extending coaxially to the pin 11' is provided at that side of the pin 11' which faces the reinforcing foil 15 and the recess 14. An adjusting screw 17 is threaded into the internal thread 11c and forms the abutment surface which contacts either the bottom of the recess 14 or the film 16. This expedient has been resorted to in view of the fact that it has been established that the distance between the cassette cover 4 and the cassette bottom portion 1 can vary to a greater or lesser extent due to manufacturing and assembly tolerances. In order to achieve a dependable indication nevertheless, the distance difference can be compensated for by turning the screw 17 in the associated internal thread 11c of the pin 11'.

Figure 4:
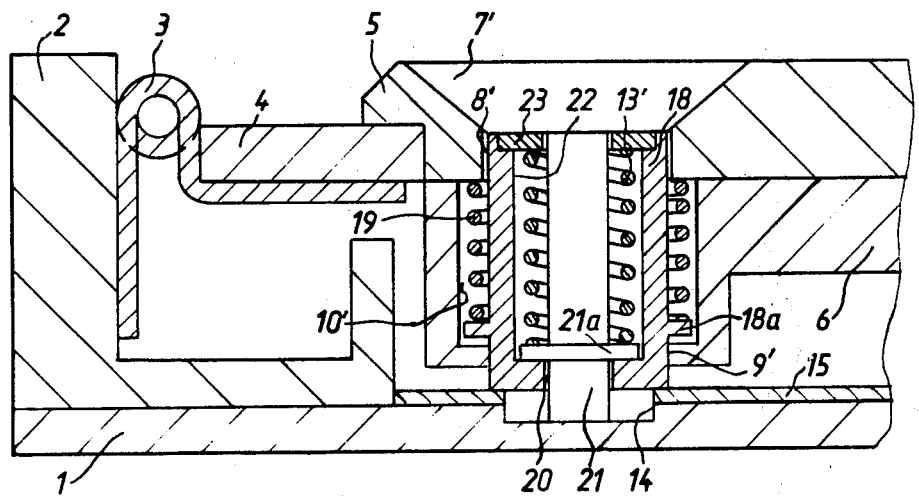
FIG. 4 is a view similar to FIG. 1 but showing a further modification of the indicating arrangement.
Figure 5:
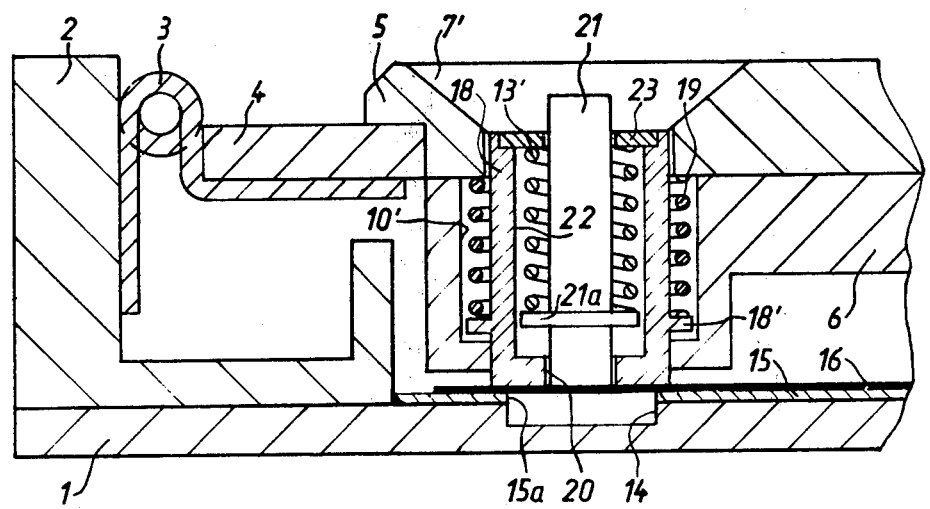
FIG. 5 is a view similar to FIG. 2 of the modification of FIG. 4.

A further modification is shown in FIGS. 4 and 5. Here again, the same or similar parts have been identified by the same reference numerals as those used before. In this modification, the manufacturing tolerances which result in the above-mentioned various distances between the cover 4 and the bottom portion 1 of the cassette are compensated for in an automatic manner. In addition thereto, these Figures also illustrate an alternative of the indicating arrangement.

A conical depression 7' is provided in the window frame 5 and communicates with a bore or hole 8'. Similarly as in FIGS. 1 and 2, the counterpiece 6 which is affixed to the lower side of the window frame 5 is provided at its lower region with a bore or hole 9' which is in registry with the hole 8' of the window frame 5. An enlarged space 10' is provided in the counterpiece 6 intermediate the holes 8' and 9'.

A cylindrical guiding member 18 is guided in the holes 8' and 9' and is provided at its periphery with an annular projection 18a which extends into the enlarged space 10' immediately upwardly of the hole 9' as considered in the position illustrated in the drawing. A compression spring 19 is arranged between the annular projection 18a and the inner side of the window frame 5 and presses the guiding member 18 into contact with the bottom portion 1 (or the reinforcing foil 15).

An axial bore or hole 20 is formed in the guiding member 18 at its side which faces the bottom portion 1 of the cassette. This hole 20 constitutes a passage in which that end of the indicating element or pin 21 which extends toward the recess 14 of the bottom portion 1 of the cassette is guided. Furthermore, the guiding member 18 has an axial cylindrical depression 22 which is larger in diameter than the hole 20 and which is closed by an annular disc 23 at that end which extends through the hole 8' of the window frame 5. The annular disc 23 has an inner diameter which is equal to that of the hole 20 in the guiding member 18, and it guides the other end of the indicating pin 21. An annular projection 21a is provided on the indicating pin 21 and extends immediately upwardly of the hole 20 in the cylindrical depression 22 of the guiding member 18. A compression spring 13 is arranged between the annular projection 21a and the annular disc 23.

The operation of the modification of the indicating arrangement of the present invention which is shown in FIGS. 4 and 5 is as follows: When film is missing from the internal space of the cassette (FIG. 4), the indicating pin 21 is moved by the force of the spring 13' into the recess 14 of the bottom portion 1 of the cassette. As a result of this, that end of the indicating pin 11 which is situated in the window frame 5 assumes the same level as the annular disc 23. When the depression 7' is investigated by feel, a relatively smooth surface can be perceived.

When the film 16 is properly received in the internal space of the cassette, as it is in the illustration of FIG. 5, the pin 21 is moved upwardly as considered in the drawing during the closing of the closure 4, by the action of the film 16, so that the upper end of the pin 21 is lifted relative to the guiding member 18 so that it extends beyond the annular disc 23 into the depression 7', and the presence of the upper end portion of the pin 21 in the depression 7' can be easily detected in a tactile manner. Here again, the position of the indicating pin 21, that is, the absence of the upper portion of the pin 21 from, or its presence in, the depression 7' can also be visually perceived. However, this visual discrimination may be further enhanced by giving the circumferential surface of the upper portion of the pin 21 a color different from that of the exposed surface of the annular disc 23 and/or the conical surface bounding the depression 7'. Of course, here again, other markings, not necessarily of the different color type, can be provided on this circumferential surface to help in the visual discrimination and thus in the determination of the loaded or non-loaded status of the cassette.

In order to compensate for the distance differences between the cover 4 and the bottom portion 1 of the cassette, the guiding member 18 is pressed downwardly by the force of the compression spring 19 so that it abuts the bottom portion 1 of the cassette or the reinforcing foil 15 outwardly of the cutout 15a or the recess 14. In this manner, there is assured an always constant distance of the indicating pin 21 relative to the recess 14, or the pin 21 will always extend to the same extent out of the guiding member 18 when the film 16 is properly located in the interior of the cassette. Inasmuch as the pin 21 is intended to extend upwardly of the guiding member 18 only by one to two millimeters, this so-called floating suspension of the indicating arrangement is of a great advantage for a dependable indication.

In the event that the distance between the closure 4 and the bottom portion 1 of the cassette deviates from that originally intended in the minus direction, then the entire guiding member 18 is pressed to a certain extent into the depression 7'. Nevertheless, the upper end of the indicating pin 21 will still extend to the same extent beyond the guiding member 18 or the annular disc 23 when the film 16 is accommodated in the cassette.

In order to assure that the pin 21 alone is moved when the film 16 is present in the internal space of the cassette, the force exerted by the compression spring 19 on the guiding member 18 exceeds that to which the compression spring 13' subjects the indicating element or pin 21.

Figure 6:
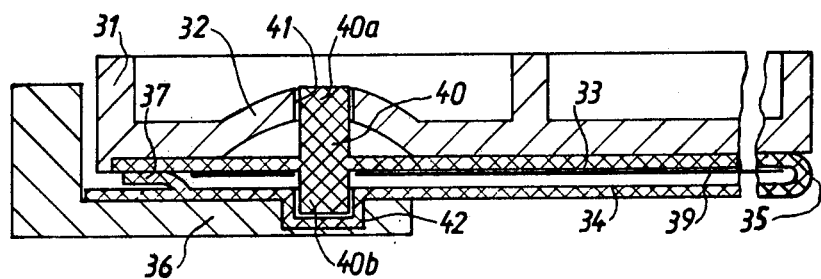
FIG. 6 is a view similar to FIG. 1 but of yet other modification of the indicating arrangement.
Figure 7:
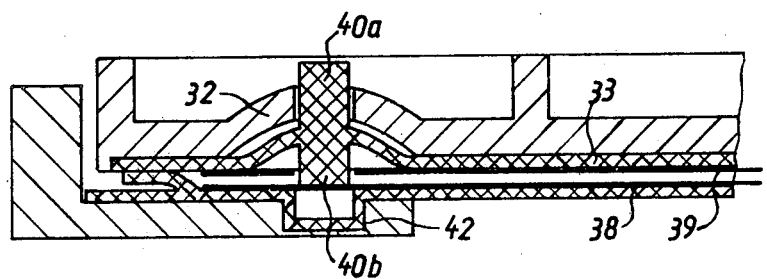
FIG. 7 is a view similar to FIG. 2 of the modification of FIG. 6.

In the FIGS. 6 and 7, the reference numeral 31 indicates a cassette bottom portion, on which there is formed a dome-shaped bulge 32. One portion 33 of a sheet of flexible material is arranged at the inner side of the cassette bottom portion 31, being preferably glued thereto, and serves as one cassette wall. Another portion of this material forms the other cassette wall 34. This material is bent through 180° on one side to form a kind of a hinge 35. The other wall 34 is affixed to a trilateral frame 36 in such a manner that only that side of the flexible material which forms the hinge 35 is free and not juxtaposed with any portion of the frame 36. A sealing lip 37 is formed at the inner side of the other wall 34 and serves as a limiting stop for the film 38 and the reinforcing foil 39. This sealing lip 37 flips over when the cassette is closed and thus assures vacuum tightness of the cassette.

A plug 40 which extends to both sides of the elastic material from the first-mentioned portion 33 thereof is provided at a border region of the cassette interior at which the presence of the film 38 is to be expected in the loaded condition of the cassette but at which no significant portion of the image is formed in the film 38 during the X-ray exposure. An outwardly oriented end 40a of the plug 40 passes through an opening 41 in the bulge 32, and an inwardly oriented end 40b of the plug 40 is guided into a recess 42 in the absence of the film 38 from the interior of the cassette. The length of the outwardly oriented end 40a of the plug 40 is so selected that the endface of this end 40a lies substantially along a common surface or plane with the bulge 32 in the normal positon of the one wall 33 of the elastic material. The length of the inwardly oriented end 40b is such that the plane of the film 38 which is located upwardly of the recess 42 is exceeded by one to three millimeters. The material of the other wall 34 is pressed into the recess 42 as well in a such a manner that the end 40b of the plug 40 can be freely guided in this recess 42. The reinforcing foil 39 which is affixed to the inner side of the first-mentioned wall or portion 33 of the cassette is provided with a cutout in the region of the plug 40.

When no film is present in the cassette, the plug 40 assumes the position illustrated in FIG. 6, in which the inner end 40b of the plug 40 extends into the recess 42 and the outer end 40a of the plug 40 is received in the opening 41 of the bulge 32. Thus, when the bulge 32 is touched under these circumstances, there is sensed an at least substantially spherical surface. Even if the exposed surface of the plug end portion 40a and the bulge 32 have the same color, the cassette can still be recognized as being of the "no film" type.

Now, if the film 38 is properly received in the internal space of the cassette, the recess 42 is covered by the film 38 so that the plug end 40b can not penetrate into the recess 42. In this manner, the plug 40, which is elastically suspended and preferably formed in one-piece on the wall 33 of elastic material, is moved into the position which is illustrated in FIG. 7, in which the outer plug end 40a extends upwardly of the dome-shaped bulge 32 to the extent of one to three millimeters. This protruding end can be tactually perceived even in a darkroom. Advantageously, the circumferential surface of the plug 40, and particularly of the upper end 40a thereof, has a different color than the bulge 32 so that the position of the plug 40 can also be determined optically.

Without further analysis, the foregoing will so fully reveal the gist of the present invention that others can, by applying current knowledge, readily adapt it for various applications without omitting features that, from the standpoint or prior art, fairly constitute essential characteristics of the generic and specific aspects of my contribution to the art and, therefore, such adaptations should and are intended to be comprehended within the meaning and range of equivalence of the claims.

We claim:

1. A receptacle for an object, particularly a cassette for an X-ray film, comprising two portions which are coextensive with one another and together define a space for receiving the object; an indicating element mounted on one of said portions for movement in a predetermined path toward and away from the other portion and having a first zone the position of which can be perceived at the exterior of the receptacle, and a second zone extending into said space; and means defining in said other portion a recess aligned with said path, covered by the object when the latter is properly received in said space, and receiving said second zone of said indicating element in the absence of the object from said space.

2. A receptacle as defined in claim 1, wherein said one portion of the receptacle has a through hole; and wherein said indicating element is guided in said hole for said movement.

3. A receptacle as defined in claim 2; wherein said indicating element is elongated and includes means for changing its length.

4. A receptacle as defined in claim 3, wherein said changing means includes an adjusting screw.

5. A receptacle as defined in claim 2; further comprising at least one spring urging said indicating element toward said other portion of the receptacle.

6. A receptacle as defined in claim 5; further comprising a guiding member receiving said indicating element and said spring and mounted in said hole for movement along said path into and out of contact with said other portion of the receptacle; and at least one additional spring of a strength exceeding that of said spring and urging said guiding member toward said other portion.

7. A receptacle as defined in claim 6, wherein said one portion of the receptacle has at least two annular regions bounding said hole at axial spacing from each other and contacting said guiding member.

8. A receptacle as defined in claim 7, wherein said guiding member bounds a passage for receiving said indicating element.

9. A receptacle as defined in claim 8, wherein said guiding member has at least one annular region bounding said passage and contacting said indicating element.

10. A receptacle as defined in claim 2, wherein said indicating element is elongated and has a first and a second end respectively constituting said first and second zones; and wherein said one portion of the receptacle has a depression at its exterior in which said first end is received in one position thereof and from which it extends beyond said one portion of the receptacle in the other position thereof.

11. A receptacle as defined in claim 2, wherein said indicating element is elongated and has a first and a second end respectively constituting said first and second zones; wherein said one portion of the receptacle has a depression at its exterior; and wherein said first end of said indicating element is absent from said depression in one, and extends into said depression in the other, of its positions.

12. A receptacle as defined in claim 1; further comprising at least one spring urging said indicating element toward said other portion of the receptacle; and wherein the properly received object causes said indicating element to move against the force of said spring.

13. A receptacle as defined in claim 1; further comprising an urging member of elastic material in said space adjacent the internal surface of said one portion of the receptacle and connected to said indicating element.

14. A receptacle as defined in claim 13, wherein said indicating element is of one-piece with said urging member.

15. A receptacle as defined in claim 13, wherein said indicating element has a cylindrical configuration and extends to both sides of said urging member.

16. A receptacle as defined in claim 15, wherein said indicating element has two sections each extending to one of the sides of said urging member and each constituting one of said zones; and wherein one of said sections is so received in said hole as to be substantially flush with the exterior of the receptacle in the absence of the object from said space and while the other section extends into said recess.

17. A receptacle as defined in claim 15, wherein said one portion of the receptacle has an outwardly bulging region around said hole into which said urging member is deflected in the presence of the object in said space and while said other section of said indicating element extends to a perceptible extent outwardly beyond the bulging region.

18. A receptacle as defined in claim 1, wherein said one portion of the receptacle has a through hole receiving and guiding said indicating element; and wherein one of said indicating element and one portion has a surface which is visible in one and concealed in the other position of said indicating element and which is visually differentiated from the surrounding area.

19. A receptacle as defined in claim 1, wherein said surface is of a different color than said surrounding area.

20. A receptacle as defined in claim 1, wherein said one portion includes a closure which is movable relative to the remainder of the receptacle; and wherein said indicating element is mounted on said closure.

* * * * *